United States Patent [19]

Kangas

[11] Patent Number: 5,355,412
[45] Date of Patent: Oct. 11, 1994

[54] IDENTIFYING SECRET DATA MESSAGES IN A ONE-DIRECTION MULTIPOINT NETWORK

[75] Inventor: Mauri Kangas, Paimio, Finland

[73] Assignee: Nokia Technology GmbH, Pforzheim, Fed. Rep. of Germany

[21] Appl. No.: 29,110

[22] Filed: Mar. 10, 1993

[30] Foreign Application Priority Data

Mar. 11, 1992 [FI] Finland .................................. 921055

[51] Int. Cl.$^5$ ............................................. H04K 1/00
[52] U.S. Cl. ........................................ 380/23; 380/20; 380/21; 380/25; 380/49
[58] Field of Search ........................ 380/20, 21, 23, 25, 380/49

[56] References Cited

U.S. PATENT DOCUMENTS

| | | | |
|---|---|---|---|
| 4,944,006 | 7/1990 | Citta et al. | 380/20 |
| 5,048,087 | 9/1991 | Trbovich et al. | 380/43 |
| 5,144,659 | 9/1992 | Jones | 380/23 |
| 5,177,788 | 1/1993 | Schanning et al. | 380/23 |

*Primary Examiner*—David C. Cain
*Attorney, Agent, or Firm*—Ware, Fressola, Van Der Sluys & Adolphson

[57] ABSTRACT

The invention relates to a method for identifying secret data messages in a one-direction multipoint network. The identifying of the data messages is carried out with the help of identification used for the error check. With the help of the method according to the invention it can be identified to whom or to which group a message is potentially transmitted without increasing the number of bits in the information transmitted and without opening all the secret data messages.

6 Claims, 2 Drawing Sheets

TRANSMITTING PERSON

INITIAL SITUATION — 10

| SECRET MESSAGE |

CRC-INITIALIZING — 12

| 0 |

| CRC-VALUE | — 14

 — 18

| CRC-IDENTIFIER | — 16

TRANSMITTED MESSAGE — 10a

| SECRET MESSAGE |

=

| CRC-PART | — 22

RECEIVING PERSON

INITIAL SITUATION

CRC-INITIAL VALUE — 24

| 0 |

— 10b

| SECRET MESSAGE |

— 22a

| CRC-PART |

RECEIVED MESSAGE
AFTER CRC-CALCULATION

| SECRET MESSAGE |

— 10c

CRC-INTERMEDIATE VALUE

| CRC-VALUE | — 26

 — 28

| CRC-PART | — 22

FINAL SITUATION — 10d

| SECRET MESSAGE |

=

| CRC-IDENTIFIER | — 16b

FIGURE 1

IDENTIFYING SECRET DATA MESSAGES IN A ONE-DIRECTION MULTIPOINT NETWORK

TECHNICAL FIELD

This invention relates to a method for identifying secret data messages in a transmitting system where a cyclic redundancy code (CRC) or checksum is used for error checking.

BACKGROUND OF THE INVENTION

In a one-direction multipoint network unique messages are sent to several different receiving persons as a steady flow. The messages have been coded with a complicated algorithm which also involves an error check. The length of the messages is kept as low as possible and the identities of the receiving persons secret.

Since the messages cannot include the identification of the receiving person in a clear form, this must be included in the secret message. Because the receiving person must distinguish which ones of the messages are for him/her, all the receiving persons have to read all the messages. This takes too much time. It should be noted here that the messages can be personally coded so that the contents of a message meant for another receiving person cannot be solved. With the help of a personal identification the receiving person can, after opening the message, determine whether the message was meant for him/her or not.

It would be advantageous to accomplish a transmitting system for secret data messages, where all the receiving persons would not have to read all the messages and where all the above-mentioned problems can be solved.

DISCLOSURE OF INVENTION

An object of the invention is to accomplish a method for identifying to whom a message is potentially transmitted without increasing the number of bits in the information transmitted and without needing to open all the secret data messages.

According to the present invention, there is provided a method for identifying secret data messages in a transmitting system where a cyclic redundancy code (CRC) or checksum is used for error checking, wherein the identifying of the data messages is carried out with the help of identification used for the error check.

Since all the messages have an error check, such as a 16-bit CRC-code, this can be used in identifying the messages without increasing the length of the messages.

These and other objects, features and advantages of the present invention will become more apparent in light of the detailed description of a best mode embodiment thereof, as illustrated in the accompanying drawing.

BRIEF DESCRIPTION OF THE DRAWING

FIG. 1 is a diagram illustrating transmitting and receiving of a secret message according to the present invention.

BEST MODE FOR CARRYING OUT THE INVENTION

The diagram shown in FIG. 1 is a diagram of transmitting and receiving of a secret message according to the present invention. In addition to his own personal identification, each receiving person or group is given a unique CRC-identification which is used in the transmitting end for CRC-calculation.

In the upper part of FIG. 1 is the initial situation before a CRC calculation, where we have the secret message in a step 10 and CRC generator having initial value zero in a step 12. When the CRC is calculated we get a CRC value as the calculation result in a step 14. Every receiving person has its own CRC identifier which is provided in a step 16, which is used in a step 18 to be exclusive-ORed (XOR) with the CRC value of step 14 to get the whole transmittable message, which is provided in a step 10a as the unchanged secret message part, and in a step 22 as a CRC part. This message with its secret message and CRC part will be sent to a receiving person.

When the receiving person is starting to receive the message as indicated in steps 10b and 22a, his/her CRC generator already has initial value zero, as indicated in a step 24. After the secret message part is used in the CRC calculation, as indicated in a step 10c and in a step 26, a CRC-value is resulted. When this CRC-value is XORed in a step 28 with the transmitted CRC part as shown provided in a step 22, the final situation will contain the unchanged secret message as shown in a step 10d and CRC-identifier as shown in a step 16b. If the transmission has been error-free and the CRC identifier provided in step 16b matches with that of the receiving person, the message is probably meant for him/her. If the number of receiving persons is fewer than the number of possible CRC identifiers, the message is certainly meant for him/her in this case. If there are multiple receiving persons in the system with the same CRC identifier, then the receiving person has to open the message to see if it is meant for him/her.

Figure 2:
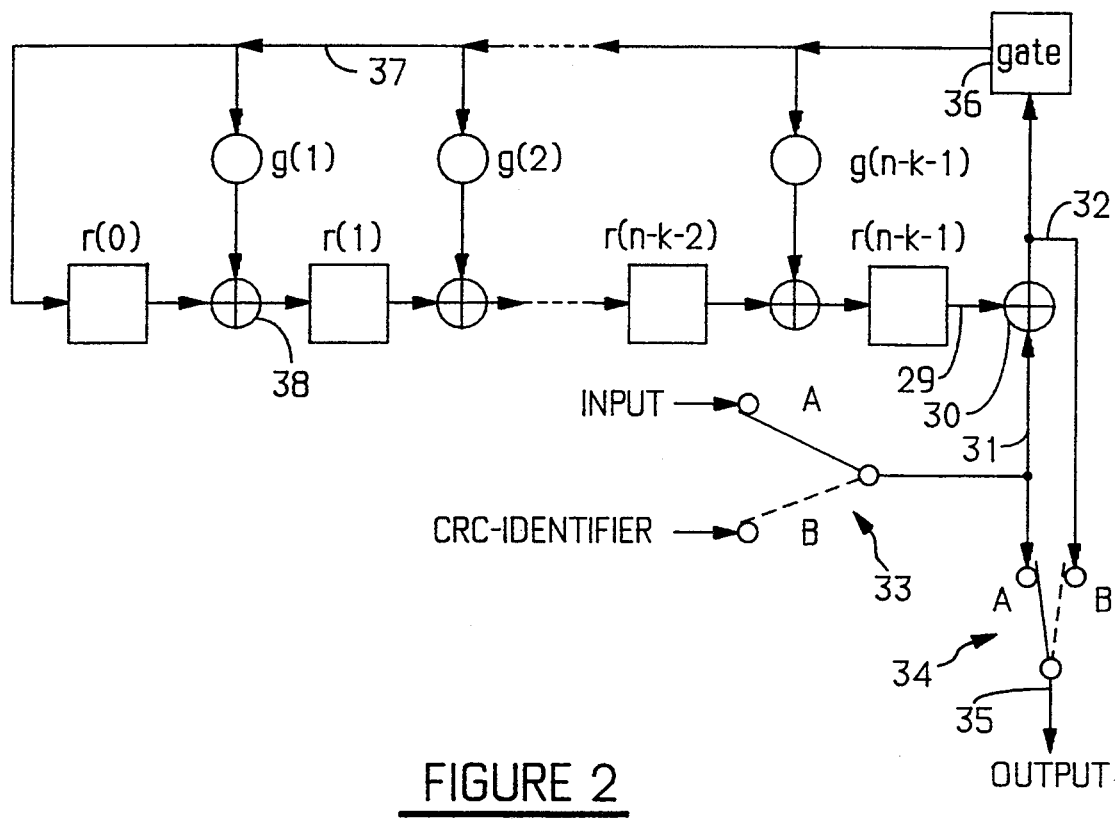
FIG. 2 is a diagram illustrating a coding circuit of a (N-k)-step transfer register according to the present invention.

The diagram shown in FIG. 2 is a diagram of a coding circuit of a (n-k)-step transfer register, according to the present invention. For the CRC-calculation of the secret message of step 14, a back-coupled transfer register as shown in FIG. 2 is used which is initialized to "0" in CRC-calculation. When the CRC-value is calculated for the transmitted message, a 16-bit CRC-value is obtained with a 16-bit coding circuit and provided on a line 29. The CRC-value is taken to an exclusive-or (XOR) function circuit 30 together with the unique CRC-identification on a line 31. The produced 16-bit CRC-part provided on a line 32 is added to the end of the message, as shown in step 22, and transmitted to the receiver.

As mentioned, the CRC generator will be initialized to zero; during the secret message part switches 33, 34 will be in position A and the input signal is fed directly to output line 35 and at the same time to the CRC coding circuit on line 31. When the secret message part is over, the coding circuit operation will be stopped using a gate 36, and the switches 33, 34 will be turned to position B. The contents of the CRC coding circuit will then be shifted out and the input will be changed to CRC identifier on line 31, which is XORed in circuit 30 with the contents of the CRC coding circuit on line 29. The result of this XOR function is provided on line 32 to the output line 35.

A back-coupled transfer register is made, e.g., of a storage circuit r(0), an AND gate g(1) with coupling factor g(k) which in the case of the gate g(1) will be 1, meaning that a signal on a line 37 from the gate 36 will be connected to an exclusive-or (XOR) gate 38 of the transfer register. This circuit may be replicated, as shown.

For different transmission systems, the transfer function g( ) can be selected optimally for each application, thus causing different types of transfer registers to be used. For every bit in the message, this back-coupled transfer register will be shifted one step ahead, and information will flow from the previous storage circuit to the next storage circuit via similarly-positioned XOR gates, as shown. During the secret message part, gate 36 is closed, making it possible for the signal to circulate back to the other end of the transfer register. When the secret message part is over, gate 36 is opened, and its output is forced to zero. This means that there is no back-coupled signal, and further stepping of the back-coupled transfer register will cause stepping out of only the final state which was valid at the moment of the secret message part end. During the secret message part, switches 33, 34 were in position A, causing the secret message to flow to the output. At the end of the secret message part, switches 33, 34 are switched to position B, and the CRC-identifier part will be transferred on line 31 into the circuitry of FIG. 2. Because the CRC-identifier part is connected to the last XOR gate 30 and the back-coupled transfer register is stepped during the CRC-identifier part, an XOR function is carried out in gate 30 for the CRC-identifier and CRC value of the secret message, as indicated in steps 14, 16, 18 of FIG. 1, thus giving the CRC part of step 22 of FIG. 1 as a result on the line 32 in FIG. 2.

Figure 3:
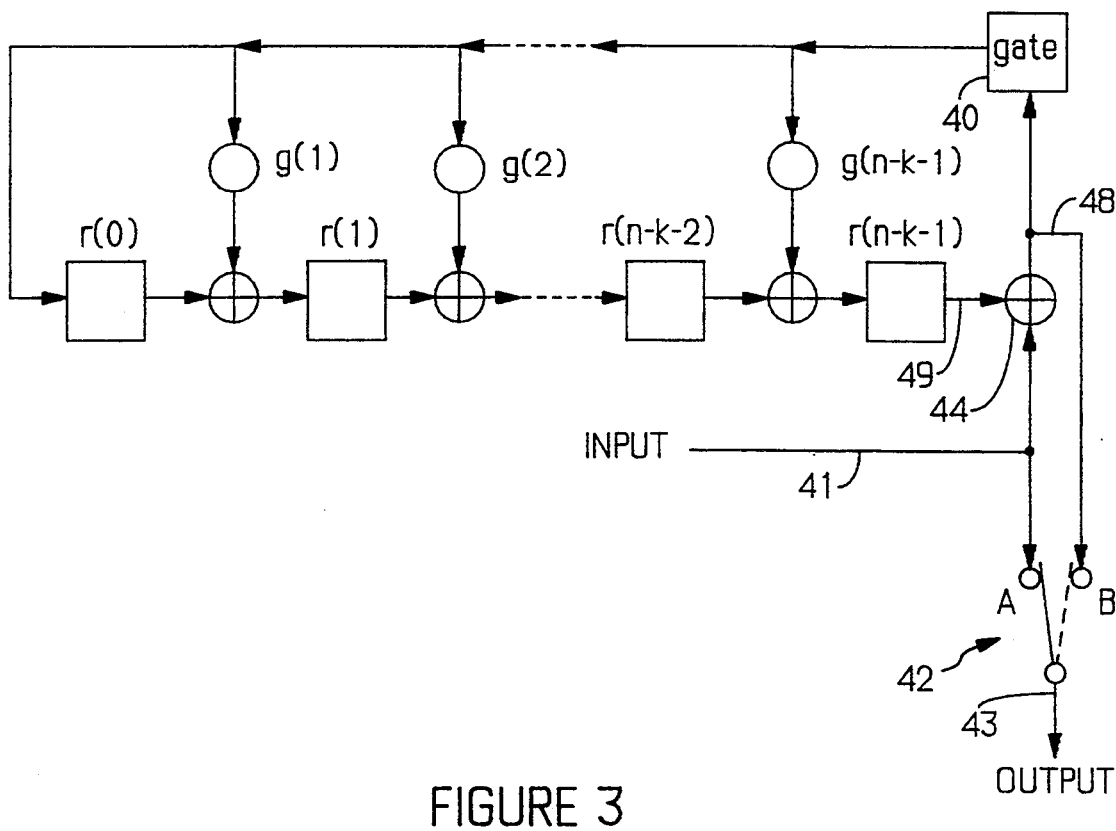
FIG. 3 is a diagram illustrating a decoding circuit of a (N-k)-step transfer register according to the present invention.

The diagram shown in FIG. 3 is a diagram of a decoding circuit of a (N-k)-step transfer register according to the present invention.

The receiving circuitry of FIG. 3 operates in the same way as described in FIG. 2 and has storage circuitry elements r(0), r(1), . . . , r(n-k-2), r(n-k-1) similar to or the same as shown in FIG. 2, as well as identical coupling factor elements g(k), g(2), . . . , g(n-k-1), related exclusive-OR gates and a gate 40 similar to gate 36 of FIG. 2. Also, the receiver transfer functions g( ) of FIG. 3 must be identical as compared to the transfer functions in the transmitter of FIG. 2.

The transfer register of the receiver of FIG. 3 is initialized to "0", as shown in step 24 of FIG. 1. When the secret message is first coming to the input on a line 41, while a switch 42 is in position A, the CRC calculation will be carried out for the secret message part, and the secret message is at the same time directed to the output on a line 43. During the secret message part, the gate 40 is closed, and the back-coupled transfer function operates in the same way for the secret message part as in the transmitter of FIG. 2. When the CRC part of the message is starting, the operation of the CRC decoding circuit will be stopped, i.e., opening gate block 40 to force a zero output and causing the back-coupled transfer register to operate as a normal shift register, and the contents of the CRC generator will be shifted out to a last XOR gate 44. This means that the sequence will be that the secret message part is connected directly to the output 43 with the switch 42 in position A and, during the CRC part, an exclusive-OR function is carried out by the gate 44 with the CRC PART on a line 41 and the contents of the back-coupled transfer register on a line 49, as previously indicated by steps 22, 26, 28 of FIG. 1 to give the CRC-identifier of step 16b of FIG. 1 on the line 48 with switch 46 in position B. If there have been no transmission errors, the signal on the line 48 will contain a CRC-identifier, will match the CRC-identifier of the receiver, and the message will be evidently meant for him/her. In other words, during the CRC part of the message, the switch is in position B so that the CRC part of the message will be XORed with the contents of the CRC decoding circuits, which it had after the secret message part. The CRC part of the operation will be the CRC identifier. If the CRC identifier matches with that of the receiving person, the appropriate message is error-free and meant for the receiving person. Otherwise, there has been a transmission error; also, if the number of receiving persons is higher than the number of possible CRC identifiers, the system must contain multiple CRC identifiers, thus causing several receiving persons to open the same messages.

If there is an error in transmitting, the receiving persons might have misinterpretations as to whom the message is meant. If the number of errors stays low, the receiving persons do not need to open the messages unnecessarily.

When there is a larger number of receiving persons than implied by the CRC identification (if the CRC value is 16 bits, the CRC identification can be, for example, 16, 7 or 6 bits), several receiving persons need to have the same CRC identification. Because of this, many messages are opened unnecessarily. Because the messages always contain the identification of the receiving person, however, the receiving persons do not get wrong information.

The error check value can be so long that it includes both error check and data message identification, but it does not necessarily need to be. If the error check parts are taken along, the XOR operation is only carried out with a part of the check part bytes or the check part is totally different. If the XOR operation is carried out with the whole error check value and the error check is so left out, the method used, however, includes an error check, as after opening a unique message the receiving person's own address must be found inside the opened message.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for identifying confidential data messages in a transmitting system where a cyclic redundancy code (CRC) is used for error check and for identifying confidential data messages only, wherein the identifying of the confidential data messages is carried out prior to decryption of the confidential data messages with the help of identification used for the error check.

2. A method as claimed in claim 1, wherein in addition to an own personal identification each receiving person is given a unique CRC identification, which is used in a transmitting end of the transmitting system for CRC calculation.

3. A method as claimed in claim 2, wherein the calculated CRC value, together with the unique CRC identification, is calculated as a function that can be calculated reversely in a receiving end of the system, the result value is added to the end of the confidential data message and is sent to the receiver.

4. A method as claimed in claim 3, wherein the calculated CRC value, together with the received CRC part, is calculated reversely at the receiving end, which gives the CRC identification of the receiving person in question as a result, when the message is meant for the receiving person in question.

5. A method as claimed in claim 3, wherein the function is an exclusive-OR function.

6. A method as claimed in claim 4, wherein the function is an exclusive-OR function.

* * * * *